United States Patent
Dickover et al.

(10) Patent No.: US 7,114,611 B2
(45) Date of Patent: Oct. 3, 2006

(54) METHODS AND APPARATUS FOR IMPROVED SELF-CHECKOUT SYSTEM

(75) Inventors: Scott Dickover, Jacksonville, FL (US); Wes Dickover, Stuart, FL (US); Mike Radzimski, Jacksonville, FL (US)

(73) Assignee: International Business Machines Corporation, Armonk, NY (US)

(*) Notice: Subject to any disclaimer, the term of this patent is extended or adjusted under 35 U.S.C. 154(b) by 100 days.

(21) Appl. No.: 10/964,540

(22) Filed: Oct. 13, 2004

(65) Prior Publication Data

US 2005/0061634 A1 Mar. 24, 2005

Related U.S. Application Data

(63) Continuation of application No. 10/077,610, filed on Feb. 15, 2002, now abandoned.

(60) Provisional application No. 60/269,598, filed on Feb. 16, 2001.

(51) Int. Cl.
 *B65G 47/44* (2006.01)

(52) U.S. Cl. ........................ 198/560; 198/600; 186/60; 186/68

(58) Field of Classification Search ................ 198/528, 198/600, 523, 535, 560–563; 186/59, 60, 186/68
See application file for complete search history.

(56) References Cited

U.S. PATENT DOCUMENTS

| | | | |
|---|---|---|---|
| 2,439,520 A | | 4/1948 | Miller |
| 3,627,108 A | * | 12/1971 | Hansen ........................ 198/600 |
| 3,688,873 A | * | 9/1972 | Potrafke et al. ............... 186/68 |
| 3,792,757 A | * | 2/1974 | Musser ......................... 186/64 |
| 4,398,253 A | * | 8/1983 | Karp et al. ................... 705/416 |
| 4,676,343 A | * | 6/1987 | Humble et al. ................ 186/61 |
| 4,766,296 A | | 8/1988 | Barth |
| 4,938,317 A | * | 7/1990 | Kohno et al. .................. 186/61 |
| 4,940,116 A | | 7/1990 | O'Connor et al. |
| 4,964,053 A | | 10/1990 | Humble |
| 5,119,924 A | | 6/1992 | Kaminski |
| 5,211,263 A | * | 5/1993 | Davidson et al. .............. 186/61 |
| 5,311,969 A | | 5/1994 | Dickover et al. |
| 5,340,970 A | | 8/1994 | Wolfe, Jr. et al. |
| 5,388,667 A | * | 2/1995 | Sonnendorfer et al. ....... 186/64 |
| 5,424,521 A | | 6/1995 | Wolfe, Jr. et al. |
| 5,609,223 A | * | 3/1997 | Iizaka et al. ................... 186/61 |

(Continued)

Primary Examiner—Douglas Hess
(74) Attorney, Agent, or Firm—Mark E. McBurney; Mintz, Levin, Cohn, Ferris, Glovsky & Popeo, P.C.

(57) ABSTRACT

A conveyor system for a self-checkout apparatus including a first side support rail having an inner side and an outer side and a second side support rail spaced apart from said first side support rail and positioned parallel thereto, where the second side support rail includes an inner side and an outer side. The system also includes a first motor mount affixed to the first side support rail at a first end, a second motor mount affixed to the second side support rail at the first end, and a drive roller having a knurled surface. The drive roller transmits a driving force from a drive motor and positioned at one end of the first side support rail and the second side support rail. The system further includes a return roller positioned at a second end of the first side support rail and the second side support rail, a pair of first tracking guides provided adjacent both ends of the driver roller, a pair of second tracking guides provided adjacent both ends of the return roller and a conveyor belt. Other embodiments of the present invention are directed to inclined roller delivery conveyors for transporting articles down an inclined under power of gravity.

2 Claims, 9 Drawing Sheets

U.S. PATENT DOCUMENTS

| | | | |
|---|---|---|---|
| 5,706,912 A | * | 1/1998 | Holland ........................ 186/68 |
| 5,755,308 A | * | 5/1998 | Lindstrom et al. ............ 186/66 |
| 5,918,728 A | | 7/1999 | Syverson |
| 5,992,570 A | | 11/1999 | Walter et al. |
| 6,668,979 B1 | * | 12/2003 | McQuaid et al. .............. 186/68 |
| 6,705,433 B1 | * | 3/2004 | McQuaid et al. .............. 186/68 |

* cited by examiner

METHODS AND APPARATUS FOR IMPROVED SELF-CHECKOUT SYSTEM

This application is a continuation of U.S. patent application No. 10/077,610, filed Feb. 15, 2002, which claims benefit under 35 U.S.C.§119(e) of U.S. provisional patent application No. 60/269,598, filed Feb. 16, 2001, the disclosure of which is herein incorporated by reference.

BACKGROUND OF THE INVENTION

1. Field of the Invention

The present invention relates to a self-service checkout system, and more particularly, to improvements to conveyors, weighing mechanisms and delivery area devices used with such systems.

2. The Prior Art

Self-service has benefited consumers and retailers alike. Such systems have been widely adapted for purchasing gasoline at self-service service stations and are now becoming more available in retail stores.

Self-service checkout systems currently on the market included conveyor systems for the automated checkout of articles selected by a customer for purchase in supermarkets and like facilities. Articles for purchase generally bear a so-called "universal product code" (UPC), typically in the form of a bar code uniquely indicative of the identity of the article bearing the code. The UPC of each article selected for purchase is scanned using a bar code scanner or read and a signal indicative of the article identity is generated and applied to a central processing unit (CPU) which has stored in associated memory storage for the UPCs of all articles available for purchase which are so encoded, correlated with the price and other characteristics of the articles, such as weight.

Articles are placed on a conveyor following UPC for transportation to a packaging area. When the article is placed on the conveyor, a scaling device incorporated with the conveyor system weighs the item. The weight obtained from the conveyor measurement is compared to a weight of the product from the database. If the weight from the conveyor is within a predetermined tolerance of the weight from the database, then the article is allowed to continue down the conveyor to a second transport conveyor where it is deposited in a collecting area. If the weights are different (taking into consideration the tolerances), then the security conveyor is reversed and the article is returned to be re-scanned and re-weighed.

One of the problems of conveyor belt weighing systems is that of accuracy. The movement of the belt, its tracking, as well as potential movement of a motor driving the conveyor each and collectively increase the inaccuracies of the weighing mechanisms. These problems are amplified by the unique backward and forward movement of the conveyor in a self service checkout devise that has security return features. Additionally these inaccuracies cause false rejection of articles, resulting in the requirement of supervisory personnel having to be present to enable the self-checkout lane to pass the article through the security zone.

This is especially a problem for light weight articles, where the tolerances used (as a result of the inaccuracies of the conveyor system weighing mechanism) are greater than that of a light-weight product. This tolerance is amplified since the weighing mechanism tolerances are incorporated into the database for each item checked against the item database. The tolerance is applied to a zero value and declared as a starting point prior to scanning in any item, for any measurement taken.

Another problem facing conveyor type self-checkout systems is utilization of the entire packaging area. Currently, as articles come off the end of the conveyor system, they encounter an incline on their way to a packaging (i.e., bagging) area. The incline imparts a frictional drag on the bottom surface. As a result, the friction stops the articles on the incline, causing the articles to back up on the incline. This ultimately jams up the end of the conveyor, and the packaging area is not utilized.

The above stated problems all result in slower purchasing and throughput times, lowering the sales volume for store owners and requiring shoppers to spend more time waiting in line.

SUMMARY OF THE INVENTION

Accordingly, the present invention addresses all of the above concerns and provides an improved self-checkout system having improved security features which allow for faster throughput times.

The present invention greatly improves the accuracy of the weighing devices used in conjunction with conveyor self-checkout systems. By enabling conveyor systems to discern zero and measure with an accuracy of preferably about 0.03 lbs. or less (approximately about 12 grams), the tolerance of the conveyor weighing mechanism is improved to a level that allows the system to recognize if there is one or two items on the conveyor belt when the weight of each item is greater than a predetermined value.

The inventors were able to arrive at their solution due to careful study of the dynamics of the moving conveyor weighing systems and the inherent problems associated with them.

Accordingly, key features of the present invention for improving weight measurement are as follows:

Improved tracking of the conveyor belt. This is accomplished in one of two ways, or both may be used for improved dynamic stability.

First, the present invention provides a light weight tracking guide to the conveyor belt so as to confine belt movement in both the forward and backward drive conditions. Preferably, the tracking guide is used as in a pair arrangement, located on either side of, say, the driver roller of the conveyor, or the return roller, and is preferably made of an ultra-high molecular weight plastic. Most preferably, the tracking guide is used in two pairs—one on either side of the drive roller, and one on either side of the return roller.

Second, the present invention provides a drive roller having a knurled surface for stabilizing slippage between the drive roller and the conveyor. Moreover, use of the knurled roller (e.g., spiral ground drive roller) is cheaper and easier than using a drive roller having a crowned surface. Use of the crowned surface gave the drive roller a slightly larger diameter in the center of the roller than the ends. Manufacturing such a roller resulted in uneven weight distribution, requiring a balancing weight to counter the imbalance. This drove roller mechanism required frequent servicing to maintain tolerances and therefore added significant maintenance cost to the end product.

Limiting Motor/Drive Roller movement.

A precision lathe-machined, ultra-high molecular weight plastic motor mount for stabilizing the motor, and dynamically stabilizing the entire system.

Accordingly, in one aspect of the present invention, a drive roller for a conveyor includes a hollow cylinder for housing a motor and a knurled surface.

In another aspect of the present invention, a mount for affixing a motor to a conveyor system in a self-checkout system is provided. The mount includes a substantially round flange having a plurality of openings for affixing the mount to the conveyor system and a central opening for receiving a portion of the motor.

In another aspect of the present invention, a tracking guide for a conveyor belt of a conveyor system is provided, where the tracking guide is mounted adjacent a drive roller. The conveyor system includes a first side support rail having an inner side and an outer side, and a second side support rail spaced apart from the first side support rail and positioned parallel thereto. The second side support rail includes an inner side and an outer side. The conveyor also includes a first motor mount affixed to the first side support rail at a first end of said first side support rail, a second motor mount affixed to the second side support rail at a first end of the second side support rail, and a hollowed drive roller having a knurled surface. The drive roller transmits a driving force from a drive motor housed within the driver roller, where the drive roller is positioned at one end of the first side support rail and the second side support rail. The conveyor also includes a return roller positioned at a second end of the first side support rail and the second side support rail. The tracking guide includes a substantially flat shape having an opening for receiving a mounting member of the drive motor. A single tracking guide is positioned on either side of the drive roller between the drive roller and the respective side support rail.

In another aspect of the present invention, a tracking guide for a conveyor belt of a conveyor system (as described above) is provided, where the tracking guide is mounted adjacent a return roller. The tracking guide includes a substantially flat shape having an opening for receiving an end of said return roller, where a single tracking guide is positioned on either side of the return roller, between the drive roller and the respective side support rail.

In yet another aspect of the present invention, a precision machined motor mount for supporting a drive motor for a conveyor system as described above is provided. The motor mount includes a central hub with an opening for receiving an end of a drive motor and having a flange for mounting the motor mount to a one of the side support rails.

In another aspect of the present invention, a conveyor system for a self-checkout apparatus includes a first side support rail having an inner side and an outer side, and a second side support rail spaced apart from the first side support rail and positioned parallel thereto. The second side support rail having an inner side and an outer side. The conveyor also including a first motor mount affixed to the outer side of the first side support rail at a first end of the first side support rail, a second motor mount affixed to the outer side of the second side support rail at a first end of the first side support rail, and a drive roller having a knurled surface. The drive roller transmits a driving force from a drive motor and is positioned at one end of the first side support rail and the second side support rail. The conveyor also includes a return roller positioned at a second end of the first side support rail and the second side support rail, a pair of first tracking guides provided adjacent both ends of the driver roller and a pair of second tracking guides provided adjacent both ends of the return roller, and a conveyor belt.

In yet another aspect of the present invention, an un-powered roller conveyor for transporting items from a motorized conveyor of a self-service checkout system to a packaging area includes a plurality of first rollers positioned adjacent one another in a substantially straight line in a first housing. The top of each roller corresponding to an inclined surface. the un-powered roller conveyor also includes at least one cassette roller positioned in a removable cassette housing. The cassette roller is positioned immediately adjacent a first roller of the plurality of rollers such that a top of said cassette roller substantially corresponds to the inclined surface, and the cassette includes a second end for positioning immediately adjacent one end of a belt conveyor.

The above aspects will be better understood with reference to the drawings briefly described below and the detailed description of the invention which follows.

DETAILED DESCRIPTION OF THE PREFERRED EMBODIMENTS

Improved Weight Measurement

As shown in FIGS. 1–4, a conveyor assembly 2 for a self-checkout apparatus includes a conveyor belt 4, driven by a knurled drive roller 6. The drive roller (enlarged view shown in FIG. 5) is a hollow cylinder which includes a knurled outer surface 6a for driving the conveyor belt 4 (the surface may also be spiral ground, but preferably is a knurled surface). A drive motor 8 is housed within the drive roller 6. With such a drive motor, the armature of the motor may remain fixed and the field magnet portion and housing (housing portion) rotate (which is affixed to the drive roller), or the armature may be attached to the drive roller in such a way as that it imparts rotation to the drive roller. Either method of transmitting motion is effective and remains a matter of design choice to one of ordinary skill in the art.

Figure 5A:
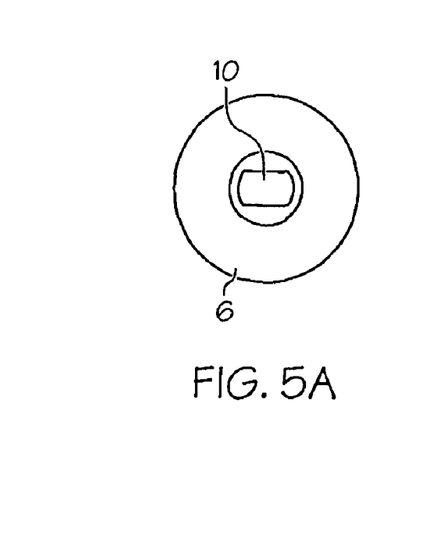
FIG. 5 illustrates a front view of the knurled drive roller for the conveyor system according to the present invention.
Figure 5B:
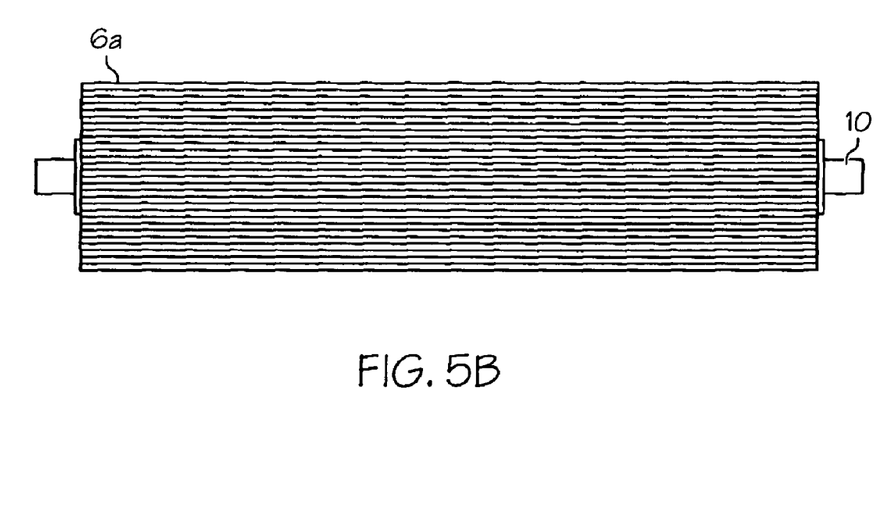

The knurled drive roller insures that the driving force from the motor is effectively transferred to the conveyor belt. Prior to the present invention, the only way to attain effective, transferred driving force to the conveyor was to use a "crowned" drive roller. Such rollers, however, as stated earlier in the disclosure, required balancing articles (i.e., shafts, rollers, weights, and the like) in order to minimize vibration. However, the problem of vibration still existed not to mention the higher costs at producing the crowned rollers.

Figure 6A:
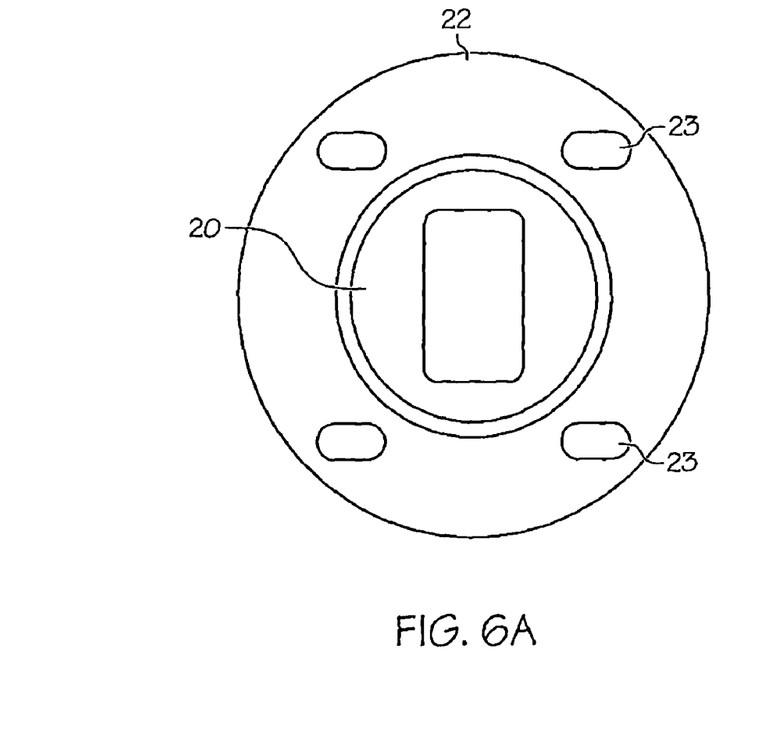
FIGS. 6A and 6B illustrates a front view and side view, respectively, of a motor mount for the conveyor system according to the present invention.
Figure 6B:
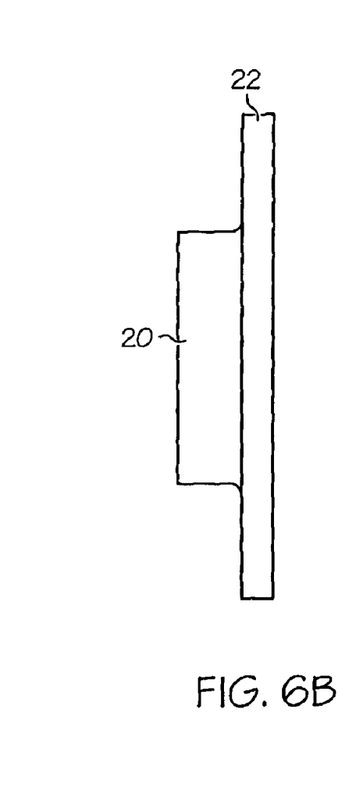

Attached to the end of the motor, is a mounting portion 10, where wires 12 for communicating electrical current to the motor are positioned. As clearly shown in the enlarged view of the system in FIG. 7, the mounting portion is received by an opening 14 in a front tracking guide 16, an opening 17 in a side conveyor housing rail 18, and ultimately by an opening in a central hub 20 of a precision, lathe machined motor mount 22 (see FIGS. 6A and 6B). The motor mount includes mounting holes 23, for affixing the mount to the side rail of the conveyor housing. However, the mount may include, for example, splined fasteners for attachment to the conveyor housing in the alternative. The mount is preferably manufactured of an ultra-high molecular weight plastic for isolating motor and drive roller vibration so as not to pass such vibrations to the conveyor housing and to decrease temperature fluctuations within the conveyor system caused by motor heat. By virtually eliminating such vibrations, the weighing mechanism accuracy is increased and the tolerance for the weighing mechanism is decreased providing stability over wide temperature ranges.

Figure 7:
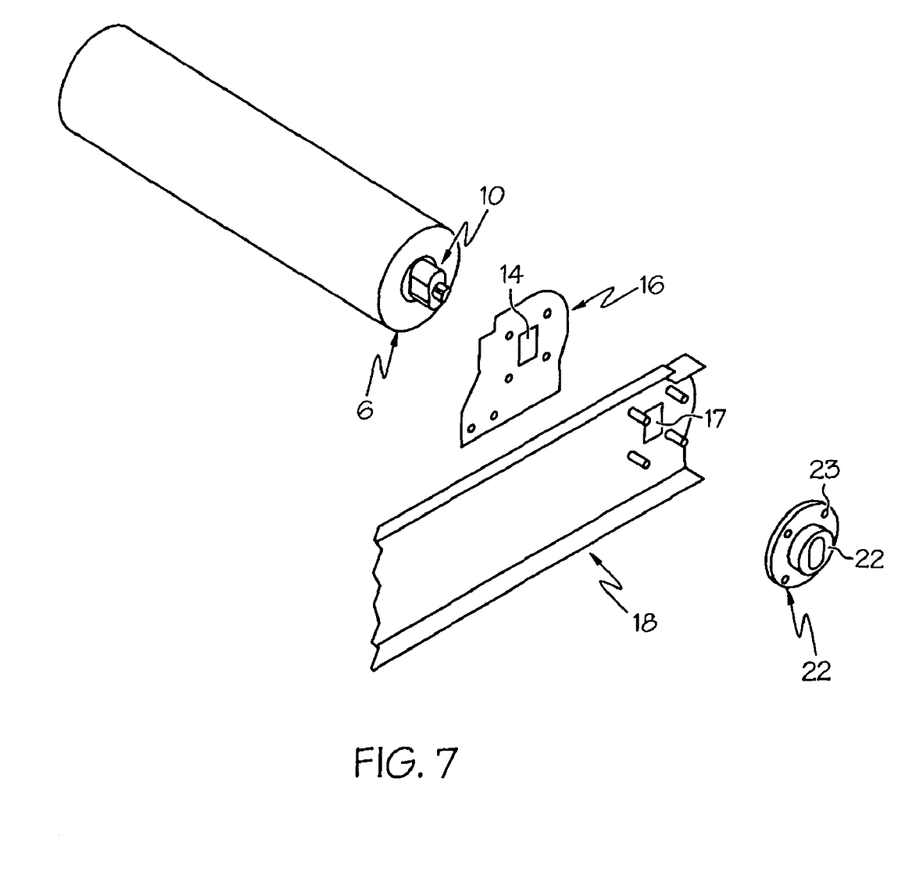
FIG. 7 illustrates an expanded perspective view of the drive-end of the conveyor system for the self-checkout system according to the present invention.

The side conveyor housing rail 18 includes a corresponding side conveyor housing rail 19 spaced apart from the rail 18. Both rails support the conveyor system and have various mounting portions for supporting tracking guides, rollers, and motor mounts. The rails are generally manufactured of a structural material including metal (i.e., steel, aluminum) or a polymer (engineered plastic and the like).

Figure 8:
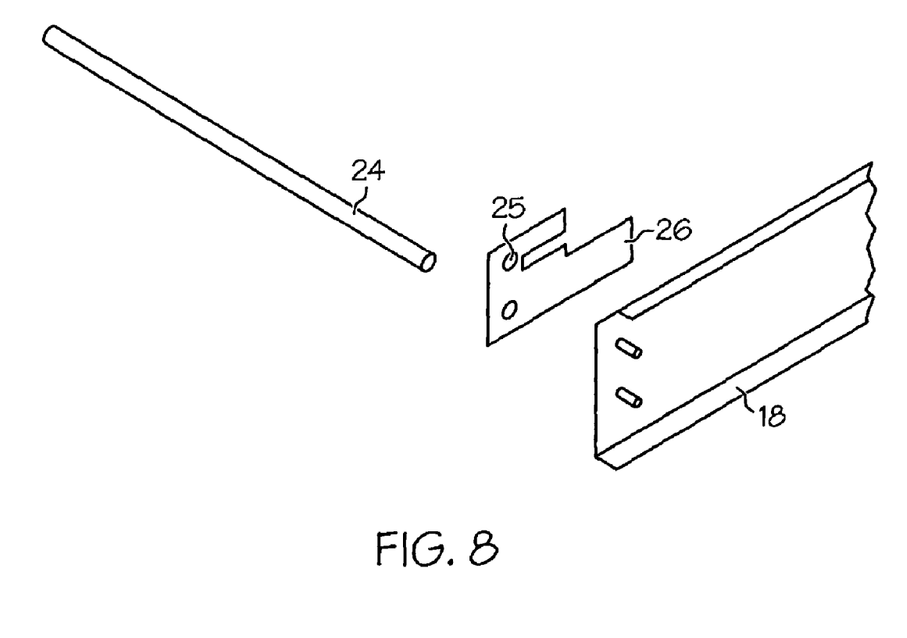
FIG. 8 illustrates an expanded perspective view of the return roller end of the conveyor system for the self-checkout system according to the present invention.

At the rear of the housing rails, as shown in an enlarged view in FIG. 8, is a return roller 24, the ends of which are received by an opening 25 in rear tracking guides 26, and a corresponding opening 27. Both front and rear tracking guides insure that the conveyor belt remains correctly positioned in the conveyor housing and adequately attached to the front drive roller and rear returnroller. By isolating the conveyor belt (i.e., keeping the belt "tracked") along a set path in this fashion, fluctuations in the weight distribution of the belt are also kept substantially to a minimum, thereby further increasing the accuracy of the weighing mechanism of the conveyor self-checkout system. Moreover, by manufacturing the tracking guides of a ultra-high molecular weight plastic, vibrations from the belt passing to the conveyor housing are kept substantially low increasing, yet again, the accuracy of the weighing mechanism and also further reducing the weighing tolerance of the system regardless of the belt being driven in the forward or reverse condition.

Both front and rear tracking guides includes mounting portions for assembly in the conveyor system between various components (e.g., the drive roller, return roller). As stated, the tracking guides virtually eliminate lateral movement of the conveyor belt between the ends of the drive roller and return roller and the conveyor housing. Preferably, a pair of tracking guides are used (two front and two rear), but a single tracking guide may also be used to limit lateral movement but to a lesser degree than a pair of tracking guides.

Figure 1:
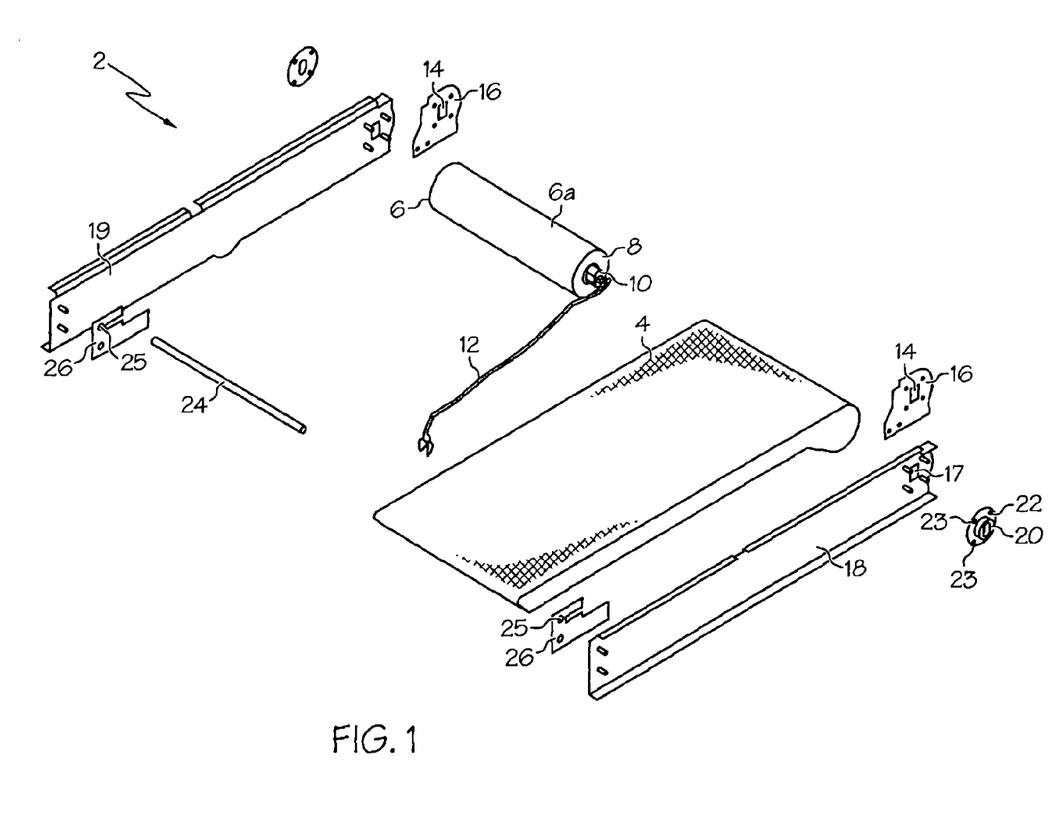
FIG. 1 illustrates a perspective view of a conveyor weighing system for a self-checkout system according to the present invention.
Figure 2:
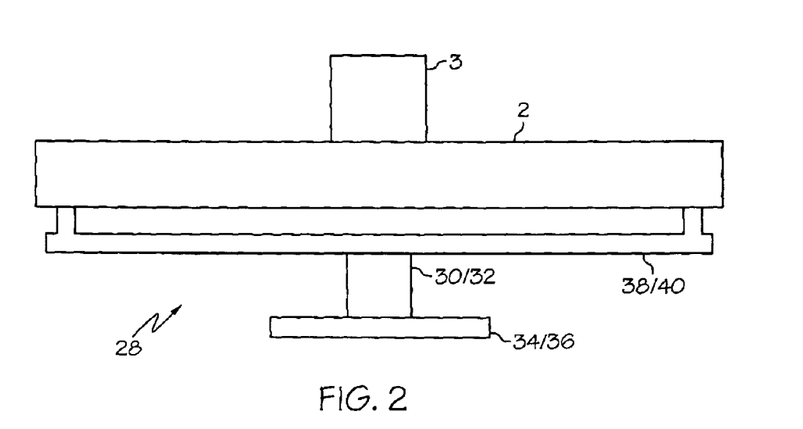
FIG. 2 illustrates a front view of a conveyor weighing system for a self-checkout system according to the present invention.
Figure 3:
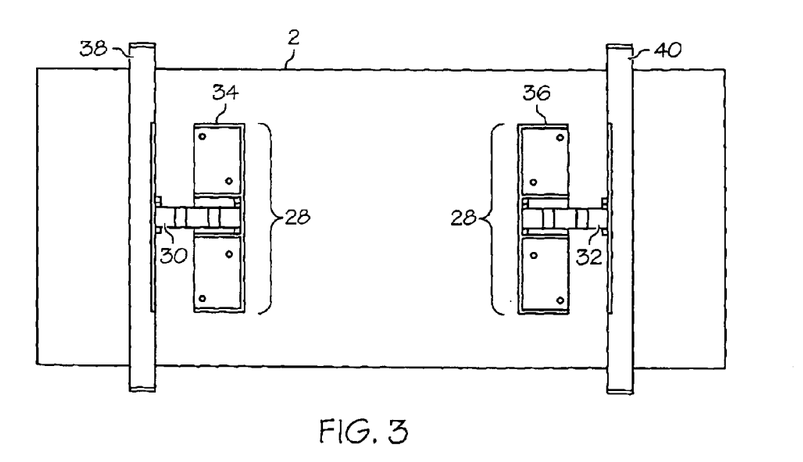
FIG. 3 illustrates a top view of a conveyor weighing system for a self-checkout system according to the present invention.
Figure 4:
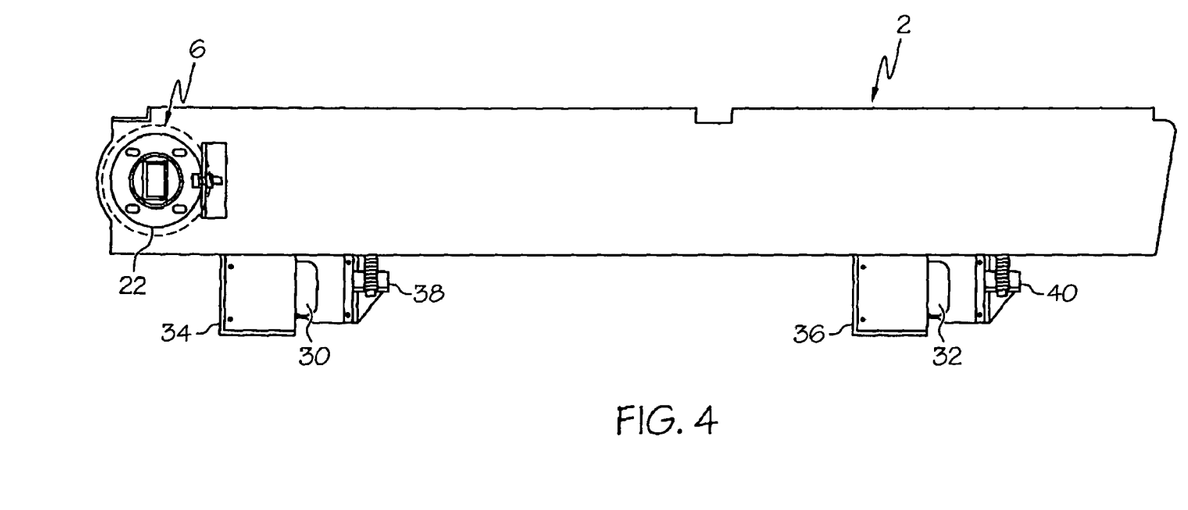
FIG. 4 illustrates a side view of a conveyor weighing system for a self-checkout system according to the present invention.

As shown in FIGS. 2 through 4, the weighing mechanism 28 generally includes a front scale 30 and a rear scale 32, having scale mounts 34 and 36, respectively, positioned under the conveyor assembly 2, which weighs an article(s) 3 placed on the conveyor. The scale mounts are affixed to a support structure (not shown) which holds the scales up from the floor of an area in which the self-checkout system is located. Thus conveyor mounts 38 and 40, positioned adjacent scales 30 and 32, respectively, pass a force associated with the weight of an article placed on the conveyor belt to the scales, and are attached to the housing rails.

Accordingly, each feature of the present invention (i.e., the knurled drive roller, tracking guides, and motor mounts), as well as the combination of the features as a whole, increases the accuracy of the scales. As a result, dynamic instability of the weighing system is virtually eliminated allowing for a highly accurate weighing mechanism which provides less article weight errors for self-checkout systems.

Improved Packaging Area Delivery

Figure 9A:
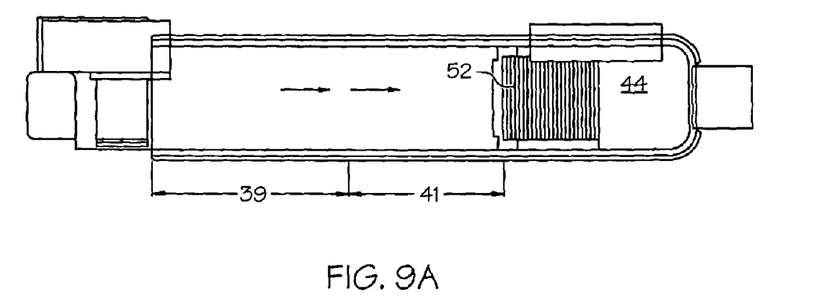
FIGS. 9A and 9B illustrate a top and side views of the self-checkout system with an un-powered and inclined roller delivery mechanism.
Figure 9B:
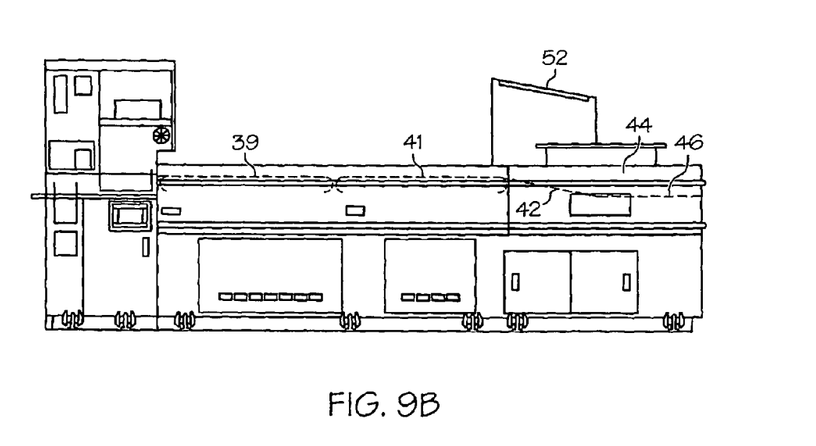
Figure 10:
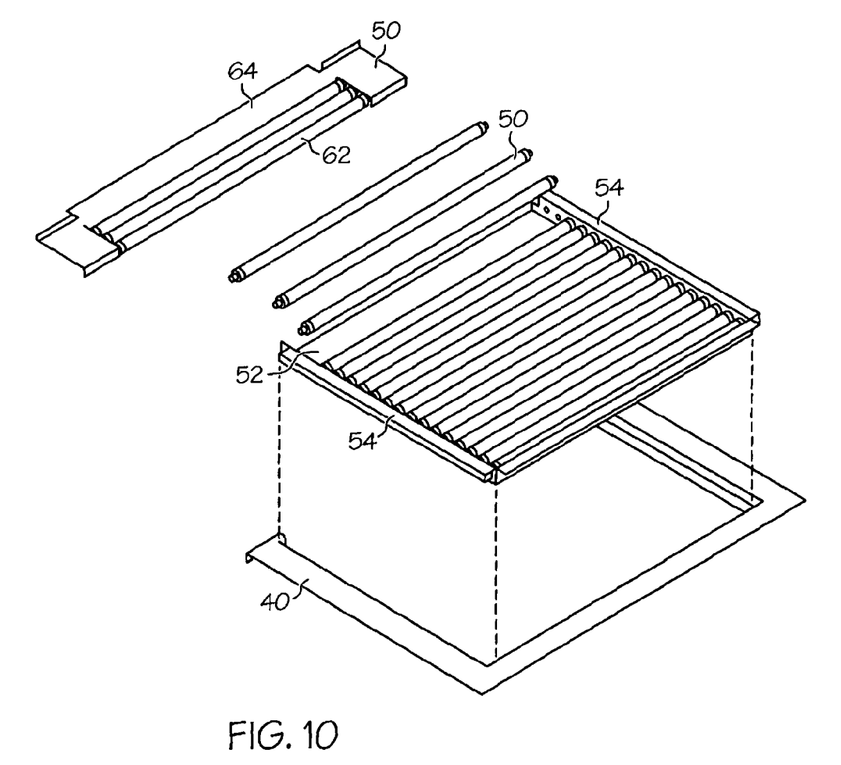
FIG. 10 illustrates a perspective view of the roller delivery mechanism.

In an alternative embodiment of the present invention, as shown in FIGS. 9A, 9B and 10, a housing 40, sits in an inclined position down a ramp represented by dashed line 42 in FIG. 9B. The incline may be from about 1 degree to about 45 degrees, but preferably is about 3–7 degrees, and most preferably about 3 degrees to the horizontal. The housing includes an end positioned immediately adjacent the end of a motorized transport conveyor 41 (the surface of the conveyor is represented by dashed line 48) transporting purchased items to a packaging area 44, represented by dashed line 46 in FIG. 9B. A conveyor 39 including the improved weighing mechanism according to the previous embodiment is positioned in front of the transport conveyor.

Within the housing sits a plurality of individual rollers 50, preferably having a diameter of approximately an inch, although any size roller having the capability of transporting an article down an incline), linked together by tray 52, having side rails 54 and 56. The tray 52 ultimately rests in the housing and is preferably removable so that the rollers, tray and housing may be cleaned from time to time. The rollers are preferably positioned in a side-by-side arrangement, so that the spacing between the individual rollers is kept (preferably) to a minimum.

At the end of the housing positioned adjacent the end of the conveyor, a roller cassette 60 containing at least one, but preferably two or more individual rollers 62, is preferably positioned (although not required to accomplish the delivery area improvement according to the present invention. The cassette is preferably removably fastened (e.g., hinged or otherwise) to a portion of the self-checkout apparatus, located adjacent the end of the conveyor.

The end of the cassette positioned adjacent the end of the conveyor includes a small portion 64 of surface which does not include rollers, so that it may rest nearly on the end of the conveyor belt (i.e., it lies only slightly above or adjacent the belt), so that articles on the conveyor easily pass from the end of the belt, onto the cassette, slide over the small portion of the surface of the cassette, and onto the rollers. Upon engagement with the rollers, the article proceeds onto the main body of the housing containing the remainder to the rollers for transport to the packaging area.

As a result of the present embodiment, as articles encounter the rollers, they immediately begin to roll down the incline, picking up speed in the process. When they reach the end of the roller system, the articles are traveling at a rate of speed that overcomes frictional drag imparted on the bottom surface of the articles from the flat surface of the packaging area portion, thus enabling the article to be driven to the farthest portion of an utilized area of the packaging area.

While the methods and apparatuses of the present invention have been described with reference to the check-out counters of a supermarket, it should be apparent to those skilled in the art that the system can be applied to any distribution system wherein articles bearing individual media that contain identification data are to be maintained under control.

Thus, having presented the present invention in view of the above described embodiments, various alterations, modifications and improvements are intended to be within the scope and spirit of the invention. The foregoing description is by way of example only and is not intended as limiting. The invention's limit is defined only in the following claims and the equivalents thereto.

The invention claimed is:

1. A self-checkout system comprising:
    a belt-conveyor having a first end and a second end;
    a packaging area; and
    a roller-conveyor positioned between the packaging area and the belt conveyor and having a direction of travel substantially coinciding with a direction of travel of the belt conveyor, wherein the roller conveyor is positioned at an incline relative to the belt conveyor and includes:
    a plurality of rollers positioned adjacent one another in a substantially straight line and a removable cassette housing comprising at least one cassette roller, wherein:
        the at least one cassette roller being positioned immediately adjacent a first roller of said plurality of rollers of the roller conveyor such that a top of said cassette roller substantially corresponds to the incline of the roller conveyor,
        the cassette housing includes a second end for positioning immediately adjacent the second end of the belt conveyor, and
        the second end of the cassette housing includes a non-roller section comprising a flat surface.

2. The self-checkout system according to claim 1, wherein the incline comprises between about 5 and about 10 degrees downward relative to the belt conveyor.

* * * * *